(12) United States Patent
Mondal et al.

(10) Patent No.: US 10,177,682 B2
(45) Date of Patent: Jan. 8, 2019

(54) SWITCHING UNIT FOR A CONVERTER MODULE FOR A MULTI-LEVEL ENERGY CONVERTER

(71) Applicant: Siemens Aktiengesellschaft, Munich (DE)

(72) Inventors: Gopal Mondal, Erlangen (DE); Matthias Neumeister, Nuremberg (DE); Sebastian Nielebock, Forchheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/561,254

(22) PCT Filed: Feb. 22, 2016

(86) PCT No.: PCT/EP2016/053660
§ 371 (c)(1),
(2) Date: Sep. 25, 2017

(87) PCT Pub. No.: WO2016/150633
PCT Pub. Date: Sep. 29, 2016

(65) Prior Publication Data
US 2018/0062536 A1 Mar. 1, 2018

(30) Foreign Application Priority Data
Mar. 24, 2015 (DE) .......................... 10 2015 205 267

(51) Int. Cl.
*H02M 7/48* (2007.01)
*H02M 7/483* (2007.01)
*H02M 5/46* (2006.01)

(52) U.S. Cl.
CPC ............. *H02M 7/483* (2013.01); *H02M 5/46* (2013.01); *H02M 7/48* (2013.01); *H02M 2007/4835* (2013.01)

(58) Field of Classification Search
CPC ...................................................... H02M 7/48
See application file for complete search history.

(56) References Cited

U.S. PATENT DOCUMENTS

| 6,236,580 B1 * | 5/2001 | Aiello ..................... H02M 7/49 363/37 |
| 2012/0112545 A1 | 5/2012 | Aiello et al. ..................... 307/65 |

(Continued)

FOREIGN PATENT DOCUMENTS

| WO | 2011/100738 A1 | 8/2011 | ............ H02M 7/483 |
| WO | 2011/124260 A1 | 10/2011 | ............... H02J 3/18 |
| WO | 2016/150633 A1 | 9/2016 | ............ H02M 7/483 |

OTHER PUBLICATIONS

Lesnicar, A. et al., "An Innovative Modular Multilevel Converter Topology Suitable for a Wide Power Range," IEEE Bologna Power Tech Conference, XP002723329, 6 Pages, Jun. 23, 2003.

(Continued)

*Primary Examiner* — Jue Zhang
*Assistant Examiner* — Trinh Q Dang
(74) *Attorney, Agent, or Firm* — Slayden Grubert Beard PLLC

(57) ABSTRACT

The present disclosure relates to converter modules. The teachings thereof may be embodied in converter modules for a multi-level energy converter. For example, a method for operating a converter module of a multi-level energy converter by means of a control unit and via a control connection may include: controlling the switching states of one of two converter module connections of the converter module and a switching unit incorporating the control connection. Two series-connected converter module capacitors con- (Continued)

nected to the switching unit respectively deliver a converter module capacitor voltage. The switching unit switches the converter module capacitor voltage of one of the converter module capacitors or a summed voltage of the series-connected converter module capacitors to the converter module connections, according to the respective switching state of the switching unit.

15 Claims, 9 Drawing Sheets

(56) References Cited

U.S. PATENT DOCUMENTS

2014/0022738 A1* 1/2014 Hiller .................. H05K 7/1432
361/730

2014/0028266 A1* 1/2014 Demetriades ............ H02J 3/32
320/136

OTHER PUBLICATIONS

Sahoo, Ashish Kumar et al., "New 3-Level Submodules for a Modular Multilevel Converter based HVDC System with Advanced Features," Department of Electrical and Computer Engineering; University of Minnesota, IECON 2013—39th Annual Conference of the IEEE, pp. 6269-6274, 2013.

Nami, Alireza et al., "Modular Multilevel Converters for HVDC Applications: Review on Converter Cells and Functionalities," IEEE Transactions on Power Electronics, vol. 30, No. 1, pp. 18-36, Jan. 1, 2015.

International Search Report and Written Opinion, Application No. PCT/EP2016/053660, 10 pages, dated Jun. 21, 2016.

* cited by examiner

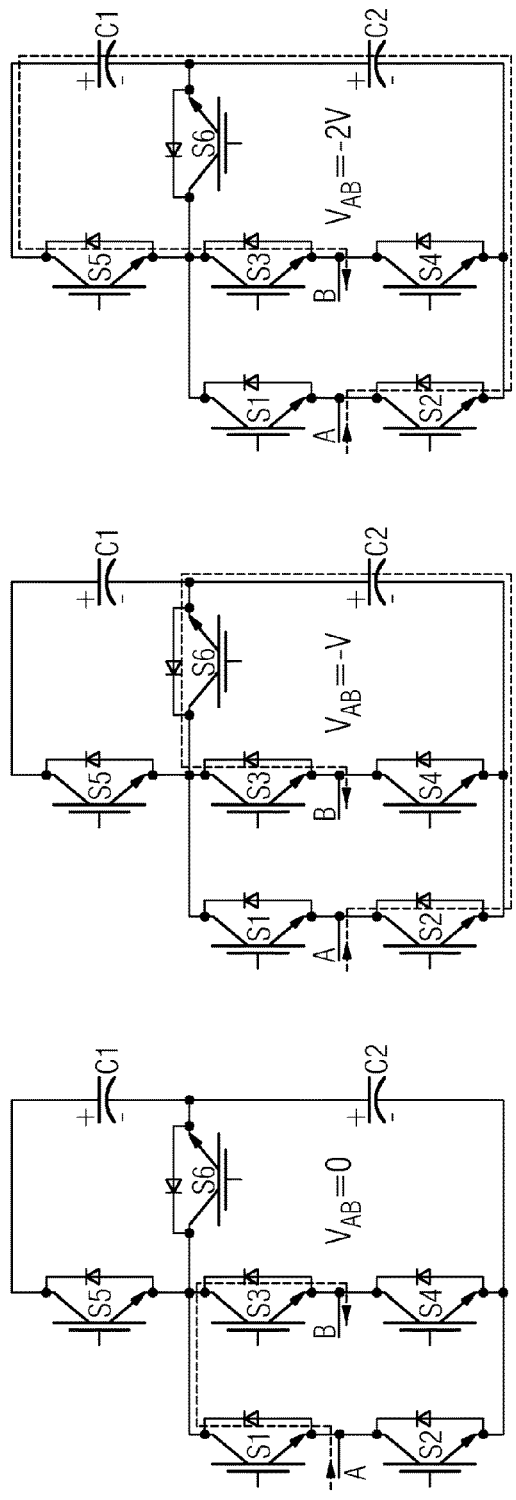

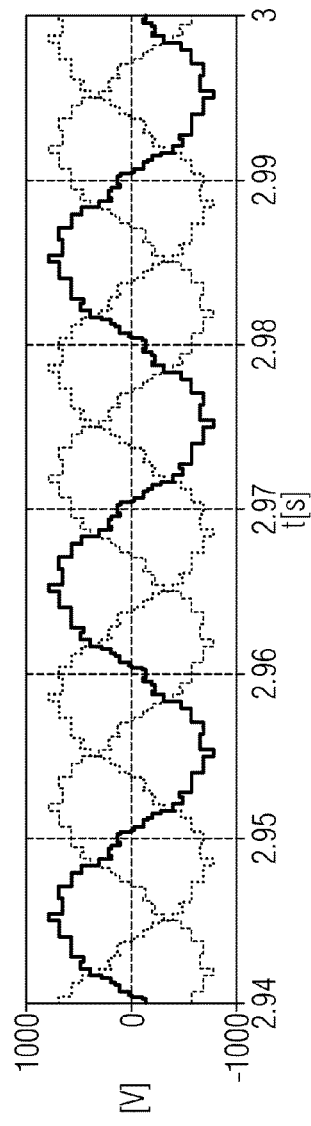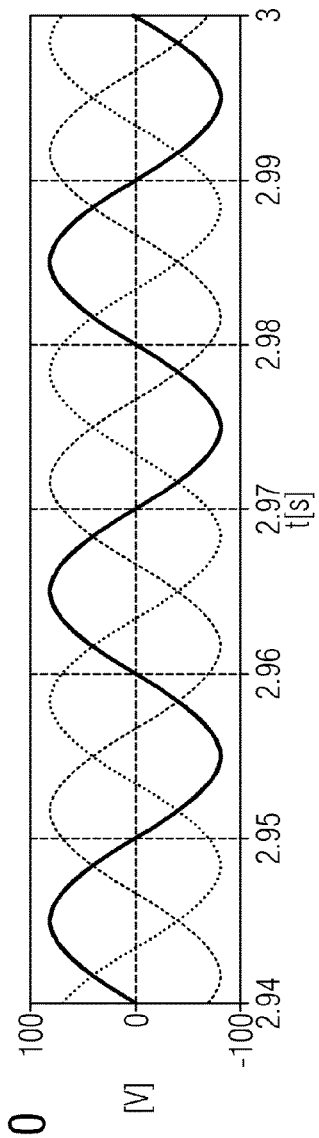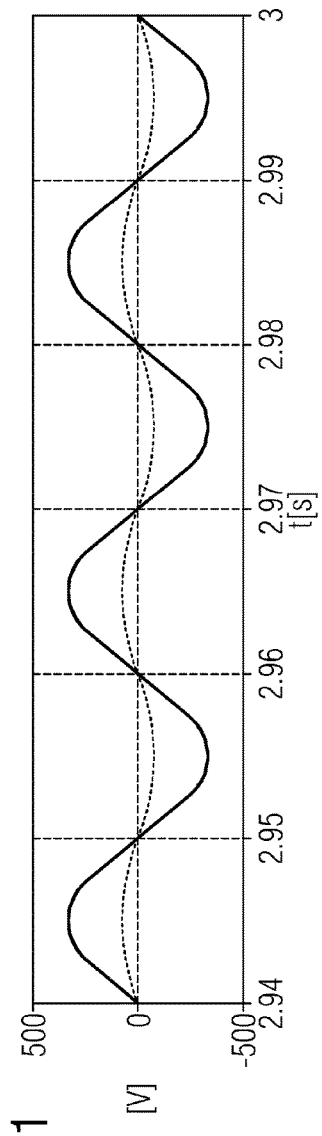

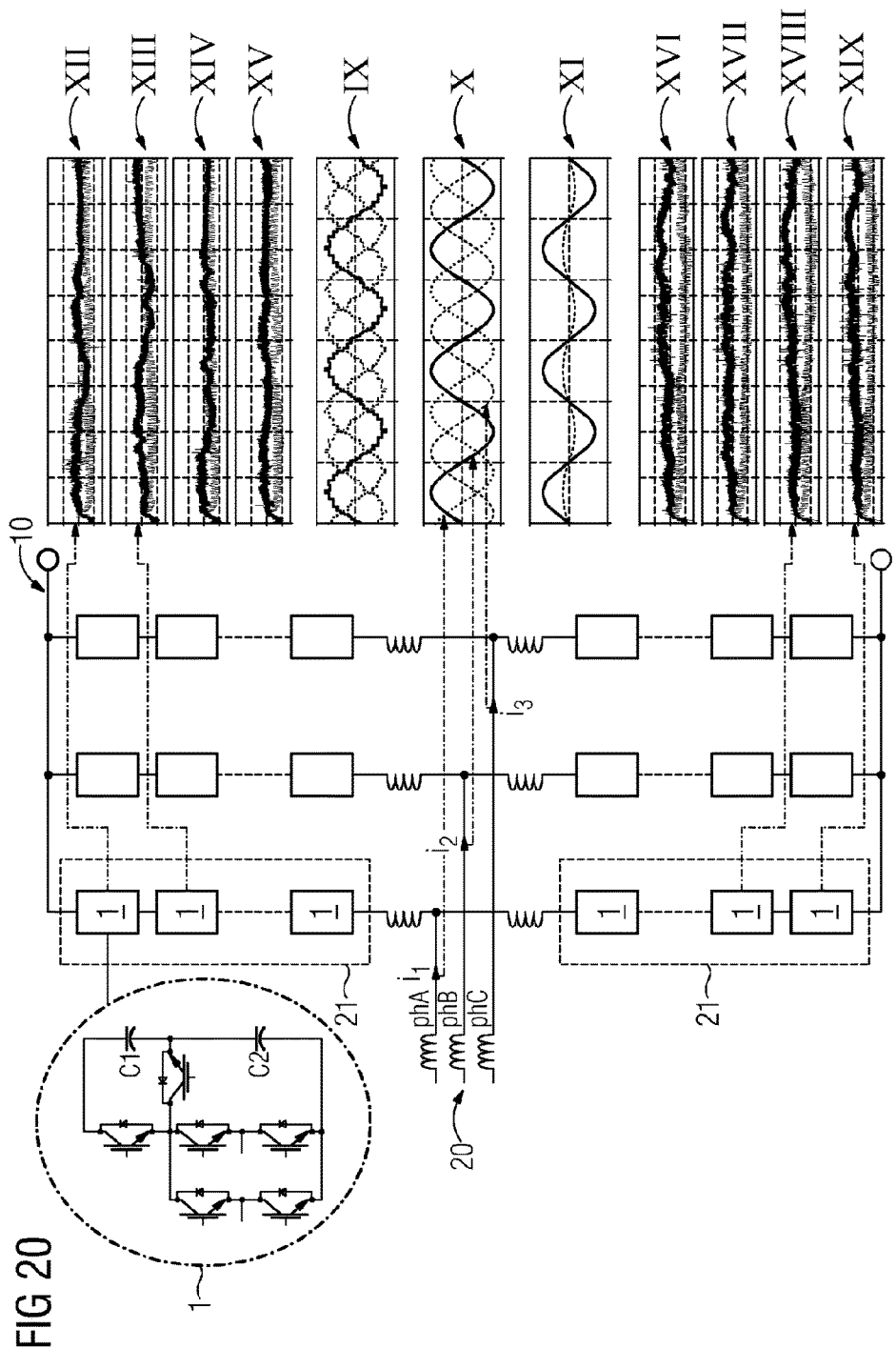

SWITCHING UNIT FOR A CONVERTER MODULE FOR A MULTI-LEVEL ENERGY CONVERTER

CROSS-REFERENCE TO RELATED APPLICATIONS

This application is a U.S. National Stage Application of International Application No. PCT/EP2016/053660 filed Feb. 22, 2016, which designates the United States of America, and claims priority to DE Application No. 10 2015 205 267.2 filed Mar. 24, 2015, the contents of which are hereby incorporated by reference in their entirety.

TECHNICAL FIELD

The present disclosure relates to converter modules. The teachings thereof may be embodied in converter modules for a multi-level energy converter.

BACKGROUND

Multi-level energy converters are a specific type of switched-mode energy converters. Multi-level energy converters are frequently employed in the field of high-voltage direct current transmission (HVDC), which involves DC voltages of the order of several 100 kV and capacities of the order of 1 GW. Preferably, multi-level energy converters of this type are employed bi-directionally, such that electrical energy can be converted from the AC side to the DC side, and vice versa. Conversion is customarily executed with no significant change in the voltage level, i.e. the level of the maximum amplitude of the AC voltage essentially corresponds to one half of the voltage level on the DC intermediate circuit.

A multi-level energy converter generally incorporates a series circuit comprised of a plurality of converter modules which, in turn, each comprise a converter module capacitor and a series-connected arrangement of two series-connected semiconductor switches, connected in parallel thereto. Control of the converter modules, in comparison with alternative circuit designs, is comparatively reliable, as a result of which multi-level energy converters are particularly suitable for applications in the field of HVDC transmission. Moreover, multi-level energy converters of generic design require no intermediate circuit capacitor which, in the field of HVDC transmission, would be exceptionally complex and expensive. Corresponding support of the intermediate DC voltage circuit is achieved by means of converter module capacitors. In the English language literature, generic multi-level energy converters are also described as modular multi-level converters, MMCs or M2Cs.

SUMMARY

The teachings of the present disclosure may be embodied in a converter module for a multi-level energy converter, such that the complexity or cost of circuits can be reduced. For example, a converter may have two converter module connections, a switching unit, and a control connection for the control of switching states of the switching unit, wherein the switching unit provides the two converter module connections of the converter module and the control connection.

Some embodiments may include a multi-level energy converter for the conversion of electrical energy, having one connection for the infeed of electrical energy to be converted and another connection for the output of the converted electrical energy, wherein the multi-level energy converter has a converter circuit which is connected to a first of the two connections of the multi-level energy converter and comprises a plurality of series-connected converter modules, and incorporates a center terminal which is coupled to the second of the connections, wherein the converter modules in the converter circuit, for the execution of control, are connected to a control unit, which controls the converter modules to convert electrical energy.

Some embodiments may include a method for operating a converter module of a multi-level energy converter wherein, by means of a control unit and via a control connection, the switching states of one of two converter module connections of the converter module and the switching unit incorporating the control connection are controlled. The invention further relates to a method for operating a multi-level energy converter for the conversion of electrical energy by means of a converter circuit, wherein electrical energy to be converted is fed to one connection, and converted electrical energy is delivered at another connection, wherein the converter circuit is connected to a first of the two connections of the multi-level energy converter and comprises a plurality of series-connected converter modules, and incorporates a center terminal which is coupled to the second of the connections, wherein the converter modules of the converter circuit are controlled by means of a control unit, in order to convert electrical energy.

Some embodiments may include a method for operating a multi-level energy converter for the conversion of electrical energy by means of a converter circuit, wherein electrical energy to be converted is fed to one connection, and converted electrical energy is delivered at another connection, wherein the converter circuit is connected to a first of the two connections of the multi-level energy converter and comprises a plurality of series-connected converter modules, and incorporates a center terminal which is coupled to the second of the connections, wherein the converter modules of the converter circuit each comprise a converter module capacitor and are controlled by means of a control unit, in order to convert electrical energy.

For example, a converter module (1) for a multi-level energy converter (10) with two converter module connections (11, 12), a switching unit (13) and a control connection for the control of switching states of the switching unit (13), wherein the switching unit (13) provides the two converter module connections (11, 12) of the converter module (1) and the control connection may include: two series-connected converter module capacitors (8, 9), which are connected to the switching unit (13). Each of the converter module capacitors (8, 9) respectively delivers a converter module capacitor voltage. The switching unit (13) is configured to switch the converter module capacitor voltage of one of the converter module capacitors (8, 9), or a summed voltage of the series-connected converter module capacitors (8, 9), to the converter module connections (11, 12), according to the respective switching state of the switching unit (13).

In some embodiments, the switching unit (13) is configured, according to the respective switching state of the switching unit (13), to alternate the polarity of the voltage switched to the converter module connections (11, 12).

In some embodiments, the switching unit (13) is configured, according to a respective switching state of the switching unit (13), to electrically short-circuit the converter module connections (11, 12).

In some embodiments, the switching unit (13) has four semiconductor switches (2, 3, 4, 5), two of which are connected in series in each case to form a series circuit (14, 15), wherein the two series circuits (14, 15) are connected in parallel and, in each case, a center terminal of one of the series circuits (14, 15) constitutes one of the converter module connections (11, 12) respectively.

In some embodiments, the switching unit (13) has two further semiconductor switches (6, 7), each of which is connected on one of its terminals to one connection point (16) of the two series circuits (14, 15), wherein the other connection point of the two series circuits (14, 15) is connected to the series-connected converter module capacitors (8, 9). The other terminal of one of the two further semiconductor switches (7) is connected to a series circuit-free connection point (17) of the series-connected converter module capacitors (8, 9), and the other terminal of the other of the two further semiconductor switches (6) is connected to a center terminal (18) constituted by the series-connected converter module capacitors (8, 9).

In some embodiments, the switching unit has two semiconductor switches, which are connected in series to form a series circuit. A center terminal of the series circuit constitutes one of the converter module connections. A connection point of the series circuit with the series-connected converter module capacitors constitutes the other of the converter module connections.

In some embodiments, the switching unit has two further semiconductor switches which, on one of their terminals respectively, are connected to a converter module connection-free connection point of the series circuit. The other terminal of one of the two further semiconductor switches is connected to a converter module connection-free connection point of the series-connected converter module capacitors. The other terminal of the other of the two further semiconductor switches is connected to a center terminal constituted by the series-connected converter module capacitors.

Some embodiments may include a multi-level energy converter (10) for the conversion of electrical energy, having one connection (19) for the infeed of electrical energy to be converted and another connection (20) for the output of the converted electrical energy. The multi-level energy converter (10) has a converter circuit (21) which is connected to a first of the two connections (19) of the multi-level energy converter (10) and comprises a plurality of series-connected converter modules (1), and incorporates a center terminal (22) which is coupled to the second of the connections. The converter modules (1) of the converter circuit (21), for the execution of control, are connected to a control unit, which controls the converter modules (1) in order to convert electrical energy. The converter modules (1) are configured according to the preceding description.

Some embodiments may include a method for operating a converter module (1) of a multi-level energy converter (10) wherein, by means of a control unit and via a control connection, the switching states of one of two converter module connections (11, 12) of the converter module (1) and the switching unit (13) incorporating the control connection are controlled. Two series-connected converter module capacitors (8, 9), which are connected to the switching unit (13), respectively deliver a converter module capacitor voltage. The switching unit (13) is configured to switch the converter module capacitor voltage of one of the converter module capacitors (8, 9), or a summed voltage of the series-connected converter module capacitors (8, 9), to the converter module connections (11, 12), according to the respective switching state of the switching unit (13).

In some embodiments, in a converter module circuit (21) of the multi-level energy converter (10), the converter module (1) is identified in which the maximum or minimum voltage difference on the series-connected converter module capacitors (8, 9) is present.

In some embodiments, for the delivery of an electrical voltage by the converter circuit (21) which requires the activation of an uneven number of converter module capacitors (8, 9) of the converter modules (1) on the converter module circuit (21), depending upon whether the charging or discharging of the converter module capacitors (8, 9) is in progress, the converter module (1) with the maximum or minimum voltage difference is selected for the activation of one of its converter module capacitors (8, 9).

In some embodiments, in the other converter modules (1) of the converter circuit (21), either both converter module capacitors (8, 9) are activated, or none of the converter module capacitors (8, 9) is activated.

In some embodiments, converter modules (1) of the converter circuit (21) are identified, in which the magnitude of the voltage difference exceeds a predetermined comparison value.

In some embodiments, depending upon the electrical voltage to be delivered by the converter circuit (21), a plurality of converter modules (1) can be selected, in which only one of the two converter module capacitors (8, 9) is activated.

In some embodiments, in the selected converter modules (1), the respective converter module capacitor (8, 9) is activated such that, in the subsequent regulation duty of the multi-level energy converter (10), the magnitude of the voltage difference is reduced.

In some embodiments, at least one of the converter modules (1) is supplied with an electric current flowing in the converter module (1), which is based upon a second-order harmonic of a converter module current.

Some embodiments may include a method for operating a multi-level energy converter (10) for the conversion of electrical energy by means of a converter circuit (21), wherein electrical energy to be converted is fed to one connection (19), and converted electrical energy is delivered at another connection (20). The the converter circuit (21) is connected to a first of the two connections (19) of the multi-level energy converter (10) and comprises a plurality of series-connected converter modules (1) and incorporates a center terminal (22) which is coupled to the second of the connections. The converter modules (1) of the converter circuit (21) are controlled by means of a control unit, in order to convert electrical energy. The converter circuit (21) has converter modules (1) as described above.

Some embodiments may include a method for operating a multi-level energy converter (10) for the conversion of electrical energy by means of a converter circuit (21), wherein electrical energy to be converted is fed to one connection (19), and converted electrical energy is delivered at another connection (20). The converter circuit (21) is connected to a first of the two connections (19) of the multi-level energy converter (10) and comprises a plurality of series-connected converter modules (1), and incorporates a center terminal (22) which is coupled to the second of the connections. The converter modules (1) of the converter circuit (21) each comprise a converter module capacitor and are controlled by means of a control unit, in order to convert electrical energy. Two respective adjoining and interconnected converter modules (1) of the converter circuit (21) are operated in pairs by the method as described above.

BRIEF DESCRIPTION OF THE DRAWINGS

Advantages and characteristics proceed from the following description of exemplary embodiments, with reference to the figures. In the figures, the same reference numbers are applied to identical components and functions. Herein:

FIGS. 9 to 11 show a schematic diagrammatic representation of voltage and current characteristics on the AC voltage connections of the multi-level energy converter according to FIG. 7, FIGS. 12 to 15 show schematic diagrammatic representations of the voltage characteristics of converter module capacitors in an upper arm of one phase A of the multi-level energy converter according to FIG. 7, FIGS. 16 to 19 show schematic diagrammatic representations of voltages on converter module capacitors of converter modules in a lower arm of phase A of the multi-level energy converter according to FIG. 7, and FIG. 20 shows a schematic overall representation of a section of the multi-level energy converter according to FIG. 7, having converter modules according to FIG. 1, together with the associated diagrams according to FIGS. 9 to 19.

DETAILED DESCRIPTION

Figure 1:
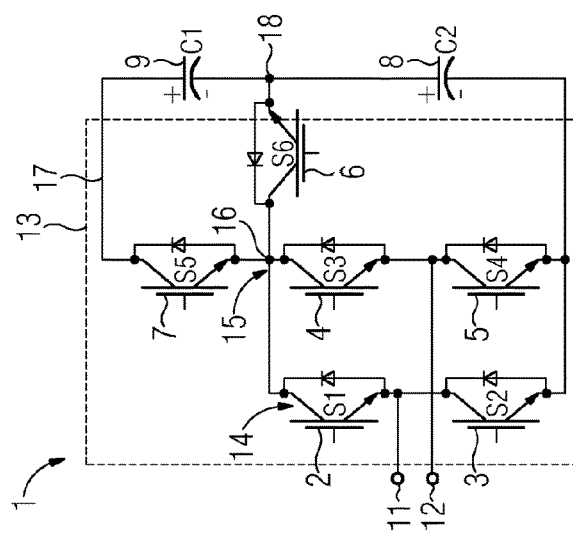
FIG. 1 shows a schematic circuit diagram of a converter module according to the teachings of the present disclosure, based on an H-bridge circuit, FIGS. 2 to 6 in a schematic circuit diagram, show current characteristics for five different voltage levels which can be delivered to converter module connections by means of the switching unit based upon the circuit structure according to FIG. 1.

As a result of progressive price reductions in the field of electronic components, even complex topologies or circuit structures now fall increasingly within the scope of the power electronics mass market. As complex circuit arrangements have generally been developed for medium- or high-voltage applications, on the grounds of prevalent marginal conditions in these voltage ranges, many requirements have been fulfilled in a comparatively intricate or complex manner. In the translation of such topologies or circuit structures to the low-voltage range, it proceeds that a number of requirements can be fulfilled in a simpler and more effective manner.

Multi-level energy converters of the generic type are proven in applications of the aforementioned type in electrical engineering. Naturally, in principle, multi-level energy converters of this type are also suitable for low-voltage applications. The benefits of very high efficiency, low switching losses and high reliability, in comparison with other energy converters, can be exploited according to the teachings of the present disclosure.

In some embodiments, the converter module comprises two series-connected converter module capacitors, which are connected to the switching unit. Each of the converter module capacitors respectively delivers a converter module capacitor voltage. The switching unit is configured to switch the converter module capacitor voltage of one of the converter module capacitors, or a summed voltage of the series-connected converter module capacitors, to the converter module connections, according to the respective switching state of the switching unit.

In some embodiments, a method for operating a converter module includes two series-connected converter module capacitors, which are connected to the switching unit, respectively deliver a converter module capacitor voltage, wherein the switching unit is configured to switch the converter module capacitor voltage of one of the converter module capacitors, or a summed voltage of the series-connected converter module capacitors, to the converter module connections according to the respective switching state of the switching unit.

In some embodiments, a method for operating a multi-level energy converter with converter modules includes that the converter modules are operated by the method for operating converter modules above. In a simple manner, this permits the adjustment of the converter module capacitor voltages on the converter module capacitors of a converter module, specifically to the effect that said voltages are essentially maintained equal. Moreover, this method can be combined with methods for the adjustment of electrical voltages of the converter module capacitors of different converter modules in a simple manner such that, with limited complexity, a control function for the multi-level energy converter can be achieved.

In some embodiments, a method for operating a multi-level energy converter includes two respective adjoining and interconnected converter modules of the converter circuit, each of which comprises a converter module capacitor, are operated in pairs by the method for operating converter modules above. In this configuration, multi-level energy converters can be retrofitted. To this end, two respectively adjoining and series-connected converter modules, with one converter module capacitor respectively, are subject to common control. By the application of the method for operating converter modules, applied to the respectively constituted converter module pairs of a converter circuit, the operation of the multi-level energy converter can be simplified and/or accelerated.

Within the meaning of this disclosure, a low voltage is specifically to be understood according to the definition of Directive n° 2006/95/EC of the European Parliament and Council of 12 Dec. 2006 for the harmonization of the legal provisions of Member States governing electrical equipment to be operated within specific voltage limits. However, the teachings are not limited to this voltage range, but can also be employed in the medium-voltage range, which may encompass a voltage range greater than 1 kV, up to and including 52 kV. In principle, the teachings can also naturally be employed in the high-voltage range.

By means of the converter module, it is possible for electrical energy to be delivered from an AC voltage connection to a DC voltage connection, or vice versa. The multi-level energy converter executes a corresponding conversion. To this end, on the intermediate DC voltage circuit of the multi-level energy converter, the converter circuit is connected to a series circuit, said series circuit comprising a plurality of series-connected converter modules. Naturally, two, three or more such converter circuits can also be connected on the intermediate DC voltage circuit, e.g., in parallel. By means of the converter circuit, the conversion of electrical energy is executed.

For example, between two of the converter circuits in the series circuit arrangement, a further series circuit of two series-connected inductances can be inserted, the connection or connection terminal of which provides the AC voltage connection. If a plurality of converter circuits is connected on the intermediate circuit, the option is furthermore provided that the converter circuits, at least partially, can be parallel-connected with respect to the DC voltage connection and the AC voltage connection. Moreover, in the case of a plurality of converter circuits, it can be provided that phase-displaced AC voltages can be delivered, for example to constitute a three-phase AC voltage network.

Each of the converter modules itself may include at least one series circuit of two semiconductor switches, to which the series-connected converter module capacitors are connected in parallel. By the semiconductor switches, the converter module capacitors can be incorporated in the conversion process in a predetermined manner. To this end, control electrodes of the semiconductor switches are connected to a converter module control circuit, which controls the semiconductor switches in an appropriate manner. In this regard, moreover, the reader is referred to a publication by Lesnicar A. and Marquardt R. entitled "An innovative modular multi-level converter topology for wide power range", published at the IEEE Power Tech Conference, Bologna, Italy, June 2003.

Within the meaning of the present disclosure, a semiconductor switch may include a controllable electronic switching element, for example a transistor, combination circuits hereof, with parallel-connected freewheeling diodes, a gate turn-off thyristor (GTO), an isolated gate bipolar transistor (IGBT), combinations hereof, or similar. In principle, the semiconductor switch can also be constituted by a metal oxide semiconductor field effect transistor (MOSFET). In some embodiments, the semiconductor switch is controllable by means of the converter module controller.

The control unit of the multi-level energy converter may determine the conditions which dictate the activation or de-activation of the corresponding element of the converter modules. To this end, the control unit, by means of sensors, can detect relevant parameters, for example on the semiconductor switches, the converter module capacitors, the converter circuit and/or similar. These parameters can be, for example, an electrical current, an electrical voltage, an electrical capacity, a phase displacement between an electrical voltage and an associated electrical current, combinations hereof, or similar.

The converter module capacitor may comprise a foil-type capacitor, a ceramic-type capacitor, an electrolyte capacitor, or similar, which is appropriate for frequency applications. Naturally, the converter module capacitor can comprise a combination of a plurality of individual capacitors, specifically of different types, as described heretofore.

Overall, by means of a converter module taught herein, in comparison with converter modules from the prior art, a greater number of different voltage levels can be delivered to the converter module connections by the switching unit. Consequently, with respect to the multi-level energy converter, the number of converter modules, and specifically the circuit complexity associated therewith, can be reduced overall. The circuit structure is thus simplified, and costs can be saved.

The switching unit may include a converter module assembly, which incorporates semiconductor switches by means of which the switching unit can achieve the desired switching states. By means of the switching unit, the electrical voltage of a selected one of the series-connected converter module capacitors can be switched to the converter module connections. In some embodiments, the switching unit may optionally switch the electrical voltage of one of the two series-connected converter module capacitors selected to the converter module connections. The switching unit may switch a summed voltage of the series-connected converter module capacitors to the converter module connections. To this end, the switching unit has an appropriately configured circuit structure, having a plurality of semiconductor switches.

Semiconductor switches, as switching elements, within the meaning of the present disclosure, are operated in switched-mode. Switched-mode operation of a semiconductor switch means that, in a switched-in state, a very low electrical resistance is present between the terminals of the semiconductor switch forming the contact gap, such that a high current flux is possible, with a very low residual voltage. In the switched-out state, the contact gap of the semiconductor switch is highly-resistant, i.e. it has a high electrical resistance such that, even in the event of a high electrical voltage on the contact gap, essentially no or only a very low, specifically a negligible current flux occurs. This is distinguished from linear operation which, however, is not employed in multi-level energy converters of the generic type.

In some embodiments, the switching unit is configured, according to the respective switching state of the switching unit, to alternate the polarity of the voltage switched to the converter module connections. By this arrangement, the number of voltage levels which can be delivered by the converter module can be further increased. Alternation can, for example, be executed by the switching unit, wherein corresponding semiconductor switches deliver a switchover function, such that the polarity of the electrical voltage delivered by one or both converter module capacitors can be alternated.

Further options for increasing the number of voltage levels available can be achieved, wherein the converter module capacitors have different electrical voltages. By means of the switching unit, these can be combined in virtually any manner required. In some embodiments, however, the series-connected converter module capacitors have an approximately equal electrical voltage. Exceptionally simple control options are provided accordingly.

In some embodiments, the switching unit is configured, according to a respective switching state of the switching unit, to electrically short-circuit the converter module connections. A zero-voltage state on the converter module can be achieved accordingly. In this case, the series-connected capacitors are disconnected on the multi-level energy converter side.

In some embodiments, the switching unit has four semiconductor switches, two of which are connected in series in each case to form a series circuit, wherein the two series circuits are connected in parallel and, in each case, a center terminal of one of the series circuits constitutes one of the converter module connections respectively. By means of this configuration, firstly, the simple provision of converter module connections can be achieved, and secondly the alternation of polarity can simultaneously be achieved in a simple manner. The circuit structure essentially corresponds to that of an H-bridge. It is also described as a full-bridge circuit.

In some embodiments, the switching unit has two further semiconductor switches, each of which is connected on one of its terminals to one connection point of the two series circuits, wherein the other connection point of the two series circuits is connected to the series-connected converter module capacitors, wherein the other terminal of one of the two further semiconductor switches is connected to a series circuit-free connection point of the series-connected converter module capacitors, and the other terminal of the other of the two further semiconductor switches is connected to a center terminal constituted by the series-connected converter module capacitors. This configuration permits, in a simple manner, either only one of the series-connected converter module capacitors to be connected to the converter module connections, or the entire series circuit.

In a simple manner, a plurality of deliverable voltage levels can thus be generated by the converter module. By means of this configuration, it is thus possible to provide a converter module which, provided that the two converter module capacitors have an approximately equal electrical voltage, can deliver five voltage levels on the converter module connections. In a conventional converter module, which is based upon an H-bridge circuit, conversely, only three voltage levels can be delivered on the converter module terminals. The aforementioned converter module according to the invention thus permits two series-connected converter modules according to the prior art to be replaced in a multi-level energy converter.

Overall, this configuration provides that two semiconductor switches can be omitted. The converter module according to the invention requires only six semiconductor switches for its operation, whereas the two corresponding converter modules from the prior art require four semiconductor switches respectively, or eight in total. A circuit engineering advantage is thus provided, which is also reflected in the reduction of complexity, given that, in a multi-level energy converter, the control circuit for semiconductor switches is generally also comparatively elaborate and complex.

In some embodiments, the switching unit has two semiconductor switches, which are connected in series to form a series circuit, wherein a center terminal of the series circuit constitutes one of the converter module connections, and wherein a connection point of the series circuit with the series-connected converter module capacitors constitutes the other of the converter module connections. This configuration is based upon a circuit structure of a half-bridge circuit, to which the basic concept of the invention can be applied in a comparable manner. Although, with reference to this specific configuration, there is no resulting reduction of semiconductor switches, circuit engineering advantages for the multi-level converter as a whole can be achieved.

In some embodiments, the switching unit has two further semiconductor switches which, on one of their terminals respectively, are connected to a converter module connection-free connection point of the series circuit, and wherein the other terminal of one of the two further semiconductor switches is connected to a converter module connection-free connection point of the series-connected converter module capacitors, and the other terminal of the other of the two further semiconductor switches is connected to a center terminal constituted by the series-connected converter module capacitors. This configuration is employed for converter modules based upon half-bridge circuits. The principle can virtually be transferred in a dual manner to half-bridge circuits.

In some embodiments, the converter module is identified in which the maximum or minimum voltage difference on the series-connected converter module capacitors is present. It can thus be determined which converter module is selected for the execution of a balancing process for the adjustment of the electrical voltages of its converter module capacitors. The maximum value is given by a voltage difference with a maximum positive value. The minimum value is given by a voltage difference with a minimum negative value. Whether the maximum or minimum voltage difference is to be employed can be dependent upon whether, in subsequent regulation duty, the converter module capacitor is to be charged or discharged.

In some embodiments, for the delivery of an electrical voltage by the converter circuit which requires the activation of an uneven number of converter module capacitors of the converter modules on the converter module circuit, depending upon whether the charging or discharging of the converter module capacitors is in progress, the converter module with the maximum or minimum voltage difference may be selected for the activation of one of its converter module capacitors. The selection may be dependent upon whether, in subsequent regulation duty, a reduction in the voltage difference can be achieved by means of charging or discharging.

In some embodiments, in the other converter modules of the converter circuit, either both converter module capacitors are activated, or none of the converter module capacitors is activated. This permits the simple control of the converter modules, with a manageable level of complexity. In some embodiments, converter modules of the converter circuit are identified, in which the magnitude of the voltage difference exceeds a predetermined comparison value. Two or more converter modules, with respect to their voltage difference, can thus be simultaneously optimized with respect to the converter module capacitor voltages. This configuration may be dependent upon the magnitude of the present voltage to be delivered by the multi-level energy converter.

In some embodiments, depending upon the electrical voltage to be delivered by the converter circuit, a plurality of converter modules can be selected, in which only one of the two converter module capacitors is activated. Thus, in a simple manner, a balancing of the converter module capacitor voltages on the respective converter modules can be achieved.

In some embodiments, in the selected converter modules, the respective converter module capacitor is activated such that, in the subsequent regulation duty of the multi-level energy converter, the magnitude of the voltage difference is reduced. For example, it can be provided that the respective converter module capacitor of the converter module to be activated is selected according to the polarity of the voltage difference. For example, if the polarity of the voltage difference changes, it can be provided that, upon the overshoot of a predetermined comparison value by the magnitude of the voltage difference of the converter module capacitors, the converter module capacitors of the respective converter module are switched over. To this end, it can be provided that one of the converter module capacitors is deactivated, whereas the other converter module capacitor is activated.

In some embodiments, at least one of the converter modules is supplied with an electric current flowing in the converter module, which is based upon a second-order harmonic of a converter module current. The converter module current is the electric current flowing across the converter module connections. It can thus be achieved that the balancing of the converter module capacitor voltages is accelerated. In some embodiments, it is not necessary for this flowing current to impact upon the converter module current. In this case, it is limited to the respective converter module.

Multi-level energy converters have proved to be particularly appropriate for high-voltage DC transmission. Outside high-voltage applications of this type, multi-level energy converters are also enjoying increasing popularity. Multi-level energy converters, also described in the English-language literature as multi-level converters (M2C, MMC), require a greater number of devices or units in the form of AC converters, with a lower number of voltage levels.

Although there are some advantages associated with the use of a large number of semiconductor switches, costs and dimensions continue to represent an important area for development, if multi-level energy converters are to be made attractive for the medium-voltage and/or low voltage range. A greater number of semiconductor switches is also associated with increased complexity, with respect to additional circuit devices such as, for example, driver circuits, output switching signals and/or similar. The basic principle of the multi-level energy converter is the achievement of a high number of output voltage levels. This permits the achievement of an output current with a very near-sinusoidal characteristic, thereby reducing expenditure for output filters.

Accordingly, the reduction of the number of semiconductor switches, without the necessity for the reduction of the number of available voltage levels may be useful. In some embodiments, this is achieved according to the teachings of the present disclosure by means of a converter module having the circuit structure represented in FIG. 1.

In principle, the circuit structure according to FIG. 1 can be understood as a combination of a full-bridge circuit for a converter module with the structure of a half-bridge circuit. This combination is achieved, wherein a converter module constituted in this manner, as represented in FIG. 1, can deliver five voltage levels which can only otherwise be achieved using a series circuit comprised of two full-bridge modules. The number of semiconductor switches can thus be reduced, without the necessity for the simultaneous reduction of the number of output voltage levels on the multi-level energy converter.

Figure 7:
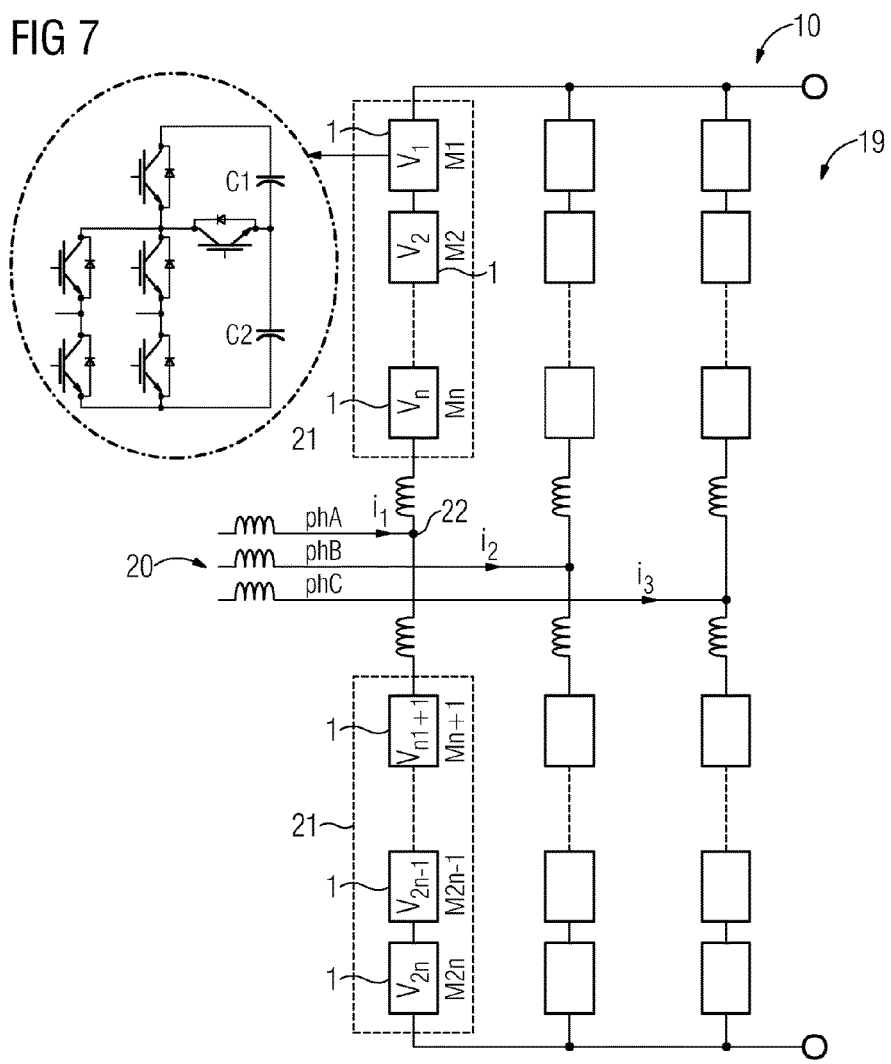
FIG. 7 shows a schematic circuit diagram of a multi-level energy converter for three-phase operation, with converter modules according to FIG. 1.

FIG. 1 shows a detailed schematic representation of the circuit structure of a converter module 1 according to the teachings of the present disclosure for a multi-level energy converter 10 (FIG. 7). The converter module 1 has two converter module connections 11, 12, and a switching unit 13. This representation does not include a control connection for the control of the switching states of the switching unit 13 by means of a control unit of the multi-level energy converter 10. The switching unit 13 provides the two converter module connections 11, 12 of the converter module 1, and the control connection.

The converter module 1 has two series-connected converter module capacitors 8, 9, which are connected on the switching unit 13. On the switching unit 13, a total of three connections constituted by the series-connected converter module capacitors 8, 9 are connected, specifically together with a center terminal 18. Each of the converter module capacitors 8, 9 thus delivers a respective converter module capacitor voltage. In the present case, the converter module capacitor voltages of the converter module capacitors 8, 9 are essentially equal, with respect to voltage value.

The switching unit 13 is configured, according to a respective switching state of the switching unit 13, to switch the converter module capacitor voltage of the converter module capacitor 8, or the summed voltage of the series-connected converter module capacitors 8, 9 to the converter module connections 11, 12. This is described in greater detail hereinafter, with reference to further figures.

From FIG. 1, it will be seen that the semiconductor switches 2 to 5 are connected in a conventional full-bridge circuit, i.e. two of these semiconductor switches are connected in series in each case, and constitute a series circuit 14, 15. In turn, the two series circuits 14, 15 of the semiconductor switches 2, 3, 4, 5 are connected in parallel. Each of the series circuits 14, 15 respectively provides one of the converter module connections 11, 12. By means of this circuit structure, the switching unit 13 is able to change the polarity of the voltage switched to the converter module terminals 11, 12 according to the respective switching state of the switching unit 13. To this end, either the semiconductor switches 2 and 5 or the semiconductor switches 3 and 4 respectively are switched-in in combination. By the alternation of the switched-in semiconductor switches, the polarity of the voltage delivered on the converter module connections 11, 12 can be changed.

From FIG. 1, it can further be seen that the switching unit 13 has two further semiconductor switches 6 and 7, each of which is connected, on one of its terminals, to a connection point 16 of the two series circuits 14, 15. The other connection point of the two series circuits 14, 15 is connected to the series-connected converter module capacitors 8, 9. The other terminal of one of the two further semiconductor switches 7 is connected to a series circuit-free connection point 17 of the series-connected converter module capacitors 8, 9. The other terminal of the other of the two further semiconductor switches 6 is connected to a center terminal 18 constituted by the series-connected converter module capacitors 8, 9.

By means of the semiconductor switches 6, 7 and the converter module capacitor 9, the converter module 1 is thus distinguished from a conventional converter module, which is based upon a full-bridge circuit, also described as an H-bridge circuit, and has only a single converter module capacitor. By means of these additional elements, it is thus possible for five different voltage levels to be delivered on the converter module connections 11, 12, as represented in the following table 1.

TABLE 1

|  | S1 | S2 | S3 | S4 | S5 | S6 |
|---|---|---|---|---|---|---|
| 2 V | 1 | 0 | 0 | 1 | 1 | 0 |
| V | 1 | 0 | 0 | 1 | 0 | 1 |
| 0 | 1 | 0 | 1 | 0 | 0 | 0 |
| −V | 0 | 1 | 1 | 0 | 0 | 1 |
| −2 V | 0 | 1 | 1 | 0 | 1 | 0 |

In the present configuration, it is provided that the converter module capacitors 8, 9 essentially have an equal electrical voltage. In table 1, this voltage is represented as "V". Accordingly, the summed voltage of the series circuit of the two converter module capacitors 8, 9 is "2V". Table 1 also includes the following classification:

S1 corresponds to semiconductor switch 2,
S2 corresponds to semiconductor switch 3,
S3 corresponds to semiconductor switch 4,
S4 corresponds to semiconductor switch 5,
S5 corresponds to semiconductor switch 7, and
S6 corresponds to semiconductor switch 6.

In table 1, the figure "1" indicates a switched-in state of the respective semiconductor switch, whereas "0" represents a switched-out state of the respective semiconductor switch.

FIGS. 2 to 5, with corresponding reference to table 1, represent the corresponding switching states, based upon the circuit structure according to FIG. 1. In FIGS. 2 to 6, a schematic current reference arrow represents the corresponding current paths for the respective switching states of the switching unit 13. The circuit structure corresponds to that represented in FIG. 1, in consequence whereof the comments made in respect thereto are applicable to these figures.

A simple calculation demonstrates the advantage of the embodiments shown. According to the prior art, a multilevel energy converter which is capable of generating 2n voltage levels on one arm is comprised of 2n full-bridge modules. If the semiconductor switches are IGBTs, the number thereof in one arm is 2n×4=8n. In a three-phase inverter of this type, 2×8n×3=48n semiconductor switches or IGBTs are required.

Conversely, a multi-level energy converter based upon the converter module 1 requires only n converter modules in one arm. It thus proceeds that the requisite number of semiconductor switches or IGBTs is 6n. In a three-phase inverter, accordingly, 2×6n×3=36n semiconductor switches are required. Multi-level energy converters with full-bridge-based converter modules have the additional advantage of a fault suppression capability, or the capability of operating as a STATCOM or similar, whereas multi-level energy converters with converter modules based upon half-bridge circuits cannot provide these additional characteristics. One reason for the capability of multi-level energy converters with converter modules based upon full-bridge circuits to deliver these additional properties is that these converter modules can generate negative voltage levels. The converter module 1 represented in FIG. 1 delivers additional functionalities of this type.

Semiconductor switches 2 to 5 may have a voltage withstand which corresponds to the summed voltage of the series-connected converter module capacitors 8, 9. In the semiconductor switches 6, 7, only a voltage withstand with respect to a single converter module capacitor voltage is required.

Figure 2:
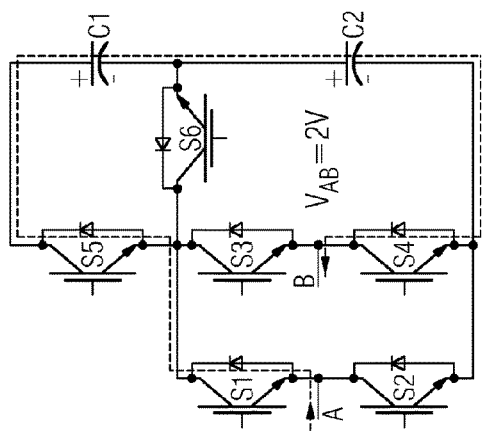
Figure 3:
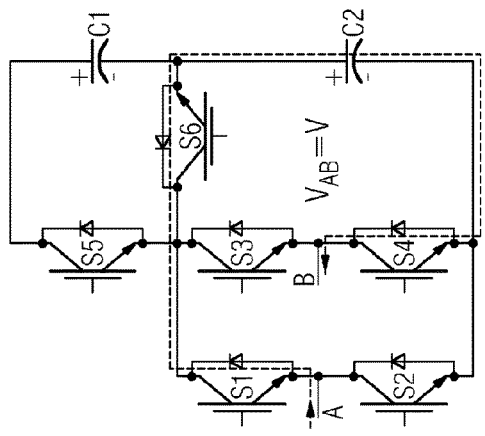

The converter module 1 may be operated by a differential control method in a multi-level energy converter, such as the multi-level energy converter 10 according to FIG. 7. In some embodiments, particular attention is paid to the maintenance of the converter module capacitor voltages at an essentially equal value. In the switching states of the switching unit 13 represented in FIGS. 2 and 3, the arm current of the multi-level energy converter 10 flows through the converter module capacitor 8. In FIG. 2, however, the arm current also flows through the converter module capacitor 9. In the absence of specific measures, this operation therefore results in a voltage difference. For this reason, a control unit may receive information on all the module voltages of the converter module 1, and specifically also information on a voltage difference between the two converter module capacitors 8, 9. An option for the balancing of the converter module capacitor voltages is disclosed hereinafter.

The arm current flows in the converter module capacitor 8 or 9, if the converter module 1 is active with respect to voltage generation in the multi-level energy converter. According to the direction of current in the converter module capacitor 8, 9, the latter is either charged or discharged. The quantity of charge or discharge is equal for all the capacitors involved, in which the arm current flows.

The electrical voltage generated by the arm current on a converter module capacitor is as follows:

$$v = \frac{1}{c}\int i \, dt,$$

where i is the arm current.

The control unit can thus ensure that the average number of charging and discharging cycles for both converter module capacitors in a single arm is equal. The DC output voltage $V_{DC}$ or $V_{narm\_avg}$, in the multi-level energy converter 10 according to FIG. 7 with a number n of converter modules 1 in one arm, can be described as follows:

$$V_{DC}=V_1+V_2+\ldots+V_n=V_{n+1}+\ldots+V_{2n-1}+V_{2n}=V_{narm\_avg},$$

where $V_1, V_2, \ldots V_{2n}$ are the module voltages of the converter module 1.

The module voltage $V_1$ is the sum of two module capacitor voltages $V_{c1}$ and $V_{c2}$. The following equation therefore applies:

$$V_1=V_{c1}+V_{c2}.$$

The function of the control unit is to achieve the following:

$$V_1=V_2=\ldots=V_n=V_{n+1}+\ldots+V_{2n-1}+V_{2n},$$

i.e. to maintain the voltages within a converter module 1 at an equal value, and also to maintain the voltage $V=V_{c1}=V_{c2}$, i.e. to maintain the converter module capacitor voltages within a converter module 1 at an equal value.

In some embodiments, the multi-level energy converter 10 detects the converter module voltages, and selects the converter modules 1 according to the present module voltages. In the present case, the module voltage is the sum of the two converter module capacitor voltages on the converter module capacitors 8, 9 (C1 and C2). However, the detection of the summed voltage does not confirm that these variables are also equal. In this case, the following relationship is additionally communicated to the control unit:

$$(V_{c1}+V_{c2})+V_{c2}=V_{c1}+2V_{c2}.$$

The control unit receives a command to generate a voltage level from 0 to level "n". The control unit may have a number of options for the selection of converter modules 1 for the low voltage level. To generate the voltage level "n", the control unit has no options, as the converter modules 1 are intended to generate the voltage level 2V. To generate the voltage level "n−1", the control unit may have the option of instructing one module to generate the voltage level V, while the remaining converter modules generate the voltage level 2V. The control unit receives the information $V_{c1}+2V_{c2}$ for all the converter modules 1. The converter module which delivers the voltage level V has the option of charging or discharging the converter module capacitor 8 (C2). Consequently, if a direction of current flow for charging is in force, the converter module 1 with the largest voltage difference $(V_{c1}-V_{c2})$ may be selected to deliver the voltage level V. If the direction of current flow for discharging is in force, the converter module 1 with the largest voltage difference $(V_{c2}-V_{c1})$ may deliver the voltage level V. The converter module with the largest voltage difference $(V_{c1}-V_{c2})$ has the lowest value for $V_{c1}+2V_{c2}$, wherein it is assumed that $V_{c1}+V_{c2}$ is constant for all the converter modules 1. Additionally, the converter module 1 with the largest difference $(V_{c2}-V_{c1})$ has the largest value for $V_{c1}+2V_{c2}$, wherein it is assumed that $V_{c1}+V_{c2}$ is constant for all the converter modules 1.

Mathematically, this is represented as follows:

$$V_{c1}+V_{c2}=M, \qquad \text{Equation (1)}$$

where M is equal to 2V, and is constant for all the converter modules 1.

In the case of the largest positive value for $(V_{c2}-V_{c1})$, the following is assumed:

$$V_{c2}-V_{c1}=k, \qquad \text{Equation (2)}$$

where "k" is a variable number for all the converter modules 1, and can vary from 0 to 2V. By the addition of these two equations, the value of $V_{c2}$ can be expressed in terms of M and k:

$$V_{C2} = \frac{1}{2}(M + k).$$  Equation (3)

The input of the converter module 1 to the control unit is as follows:

$$V_{c1}+2V_{c2}=(V_{c1}+V_{c2})+V_{c2}.$$  Equation (4)

In consideration of equation (1), this gives the following:

$$(V_{c1}+V_{c2})+V_{c2}=M+V_{c2}.$$  Equation (5)

By the replacement of $V_{c2}$ with equation (3) in equation (5), the individual converter module information is obtained:

$$V_{C1} + 2V_{C2} = \frac{3}{2}M + \frac{1}{2}K.$$

Consequently, the converter module 1 with the largest value for k has the highest value for $(V_{c1}+2V_{c2})$ in the arm of the multi-level energy converter 10. The converter module 1 with the largest value for $(V_{c2}-V_{c1})$ may discharge the converter module capacitor 8, such that the converter module 1 in the arm with the largest value for $(V_{c1}+2V_{c2})$ is selected, in order to deliver the voltage level V during the discharging associated with the arm current. In a comparable manner, the situation is represented in which the arm current is employed for charging, wherein the converter module 1 in the arm with the lowest value for $(V_{c1}+2V_{c2})$ is selected to deliver the voltage level V.

To increase the speed of converter module capacitor voltage balancing, a second-order harmonic may be initiated as a circulating current within the converter module 1. This second harmonic is not visible on the output of the multi-level energy converter 10, but assists the multi-level energy converter in the more rapid balancing of the converter module capacitors 8, 9 of the converter modules 1, with respect to their converter module capacitor voltages, by increasing the charging/discharging cycles.

Figure 8:
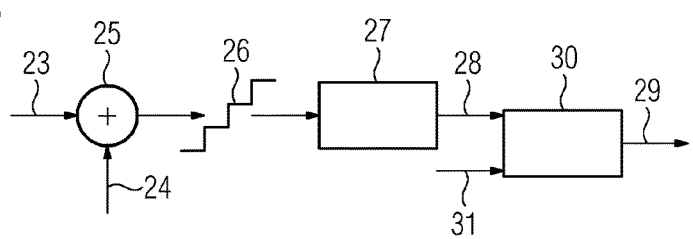
FIG. 8 shows a schematic block circuit diagram of a section of a control unit for the regulation of capacitor voltages of the series-connected converter module capacitors in a converter module, and in a multi-level energy converter comprising such a converter module.

FIG. 8 shows a schematic block circuit diagram of a program sequence for the control unit for the execution of the aforementioned method. The process sequence incorporates an adder 25, to which a modulation reference 23 is referred. At the same time, a second harmonic 24 is applied to the adder 25. From the above, the adder 25 generates a level control signal 26, which is routed to a sorter 27. The sorter 27 sorts the converter modules 1 with respect to the converter module capacitor voltages, as follows:

Converter module capacitor voltages for the first converter module 1: $(C_1+2*C_2)^1$, Converter module capacitor voltages for the second converter module 1: $(C_1+2*C_2)^2$,

...

Converter module capacitor voltages for the $n^{th}$ converter module 1: $(C_1+2*C_2)^n$.

The sorter 27 delivers a sequence of modules 28 to a computer 30, to which a present value of the arm current 31 is also transmitted simultaneously. The computer 30 executes the following schematically-represented program sequence:

In a stage n, no selection is applied, as all the converter modules 1 in this case are delivering a voltage level of 2V.

In a stage (n−1), by means of one of the converter modules 1, a voltage level of V is delivered, while the remaining converter modules 1 deliver a voltage level of 2V. If the arm current 31 charges the converter modules 1, the converter module 1 with the lowest charge has a charge of ≤V, and the remaining converter modules 1 have a charge of ≤2V. If the arm current 31 discharges the converter modules 31, the converter module 1 with the highest charge has a charge of ≤V, and the remaining converter modules 1 have a charge of ≤V.

In a stage (n−2), one of the converter modules 1 has a voltage level of 0, and the remaining converter modules 1 have a voltage level of 2V. If the arm current 31 charges the converter modules 1, the converter module 1 with the lowest charge has a voltage level of ≤0, and the remaining converter modules 1 have a voltage level of ≤2V. If the arm current 31 discharges the converter modules 1, the converter module 1 with the highest charge has a voltage level of ≤0, and the remaining converter modules 1 have a voltage level of ≤V.

The program sequence continues correspondingly for the further stages. As an output, the computer 30 delivers a module selection signal 29, by means of which the corresponding converter module 1 is selected.

The following comments relate to a simulation which represents the operating method, with reference to FIGS. 9 to 20. The method has been verified using SIMULINK. The basis considered is a multi-level energy converter 10, as already described with reference to FIG. 7, the converter circuits 21 of which respectively comprise four converter modules 1 according to FIG. 1. An arm current flows in each of the converter circuits 21. In respect hereto, the reader is referred to the corresponding descriptions above. Each of the converter modules 1 can generate a maximum voltage level of 2V. This gives a maximum arm-related voltage level of 8V. It should be considered that two series-connected converter circuits 21 constitute one arm respectively, in which the arm current flows.

In the following table 2, converter module voltages for each arm voltage level are represented:

TABLE 2

| Arm voltage stage | Converter module 1 | Converter module 2 | Converter module 3 | Converter module 4 |
|---|---|---|---|---|
| 8 | 2 V | 2 V | 2 V | 2 V |
| 7 | 2 V | 2 V | 2 V | V |
| 6 | 2 V | 2 V | 2 V | 0 |
| 5 | 2 V | 2 V | V | 0 |
| 4 | 2 V | 2 V | 0 | 0 |
| 3 | 2 V | V | 0 | 0 |
| 2 | 2 V | 0 | 0 | 0 |
| 1 | V | 0 | 0 | 0 |
| 0 | 0 | 0 | 0 | 0 |

The following fundamental simulation parameters have been assumed:

TABLE 3

| Inductance | 10 mH |
|---|---|
| Converter module capacitance | 7.5 mF |
| Arm inductance | 50 μH |
| DC voltage | 750 V |
| Average capacitor voltage | 93.75 V |
| Total module voltage | 187.5 V |
| AC frequency | 50 Hz |
| AC voltage | 230 V |
| Load | 56.25 kW |

The results of simulations are represented in FIGS. 9 to 11. The schematic diagrams in FIGS. 9 to 11 all have the same time base plotted on the x-axis, with a time division by seconds. In FIG. 9, the inverter voltage in volts in plotted on the y-axis. In FIG. 10, the inverter current in amperes is plotted on the y-axis whereas, in FIG. 11, the current and voltage of an inverter phase are represented together. From FIG. 11, it will be seen that the phase displacement is approximately 0. In FIG. 9, the three phase voltages of the inverter are represented one above the other, while FIG. 10 represents the corresponding phase currents of the inverter.

Figure 12:
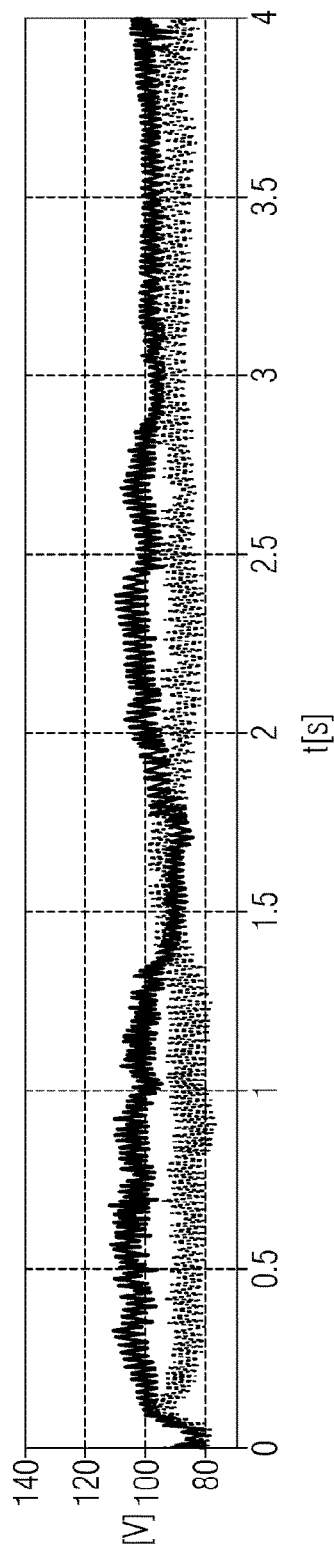
Figure 13:
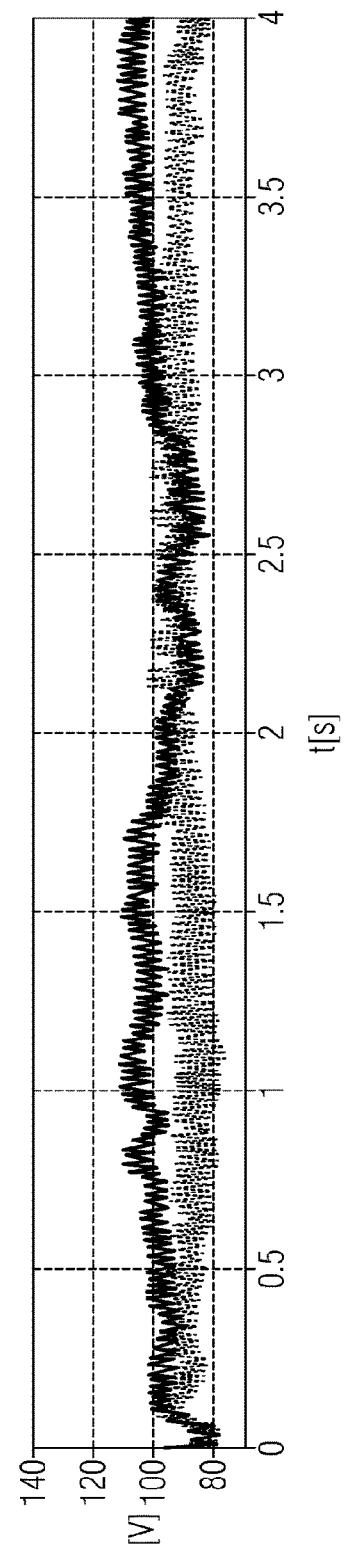
Figure 14:
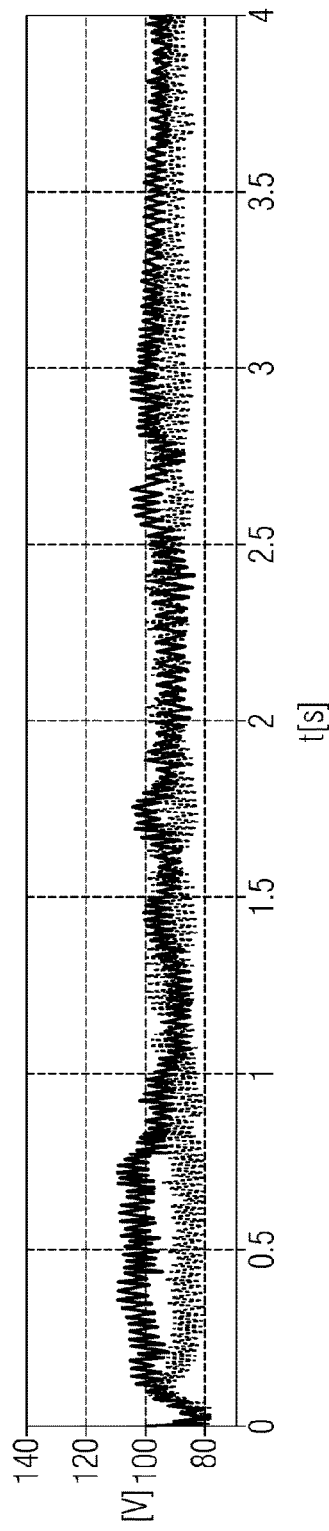
Figure 15:
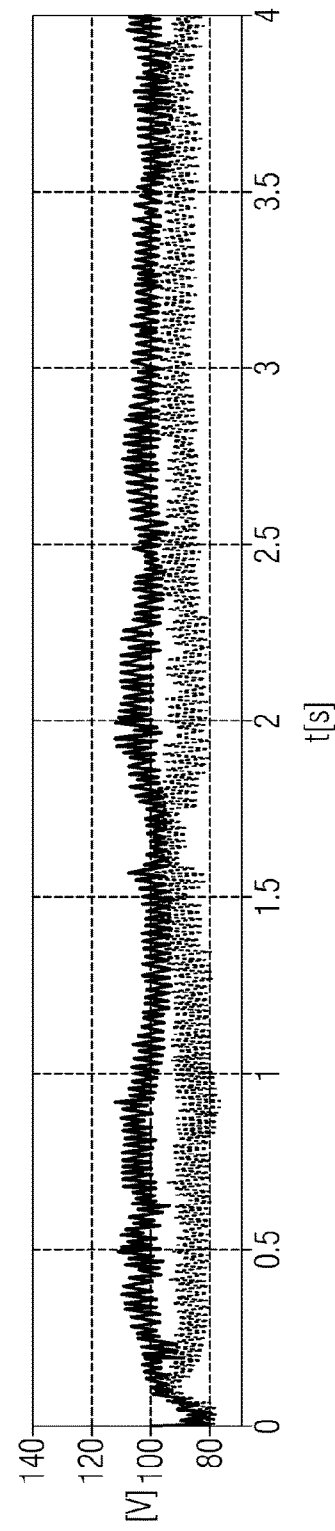
Figure 16:
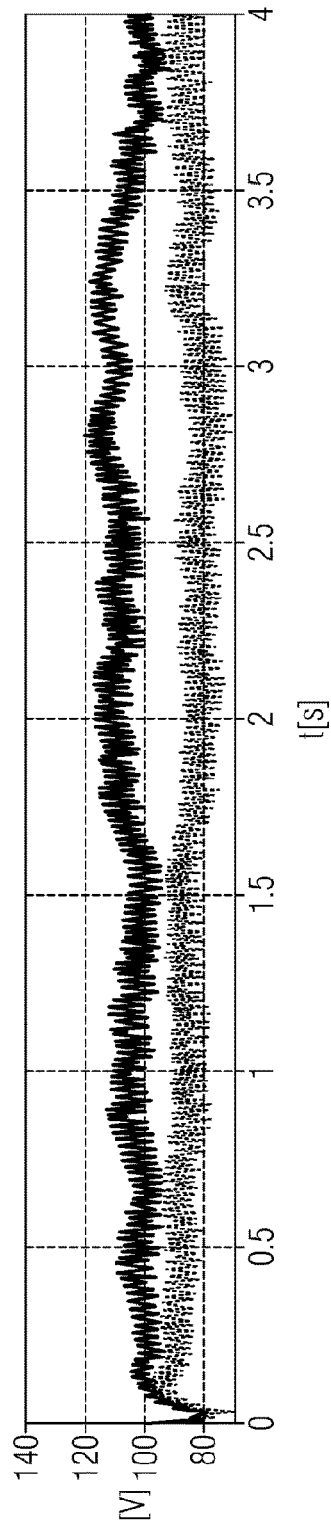
Figure 17:
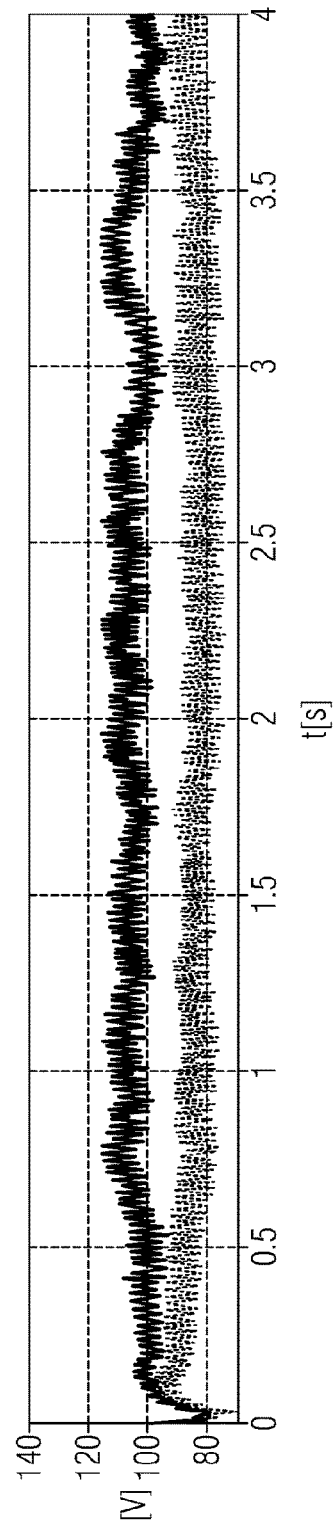
Figure 18:
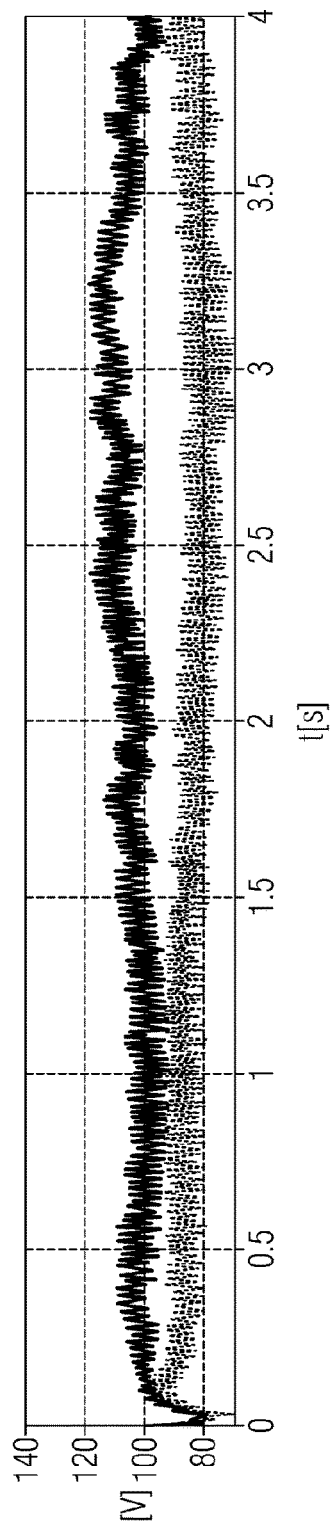
Figure 19:
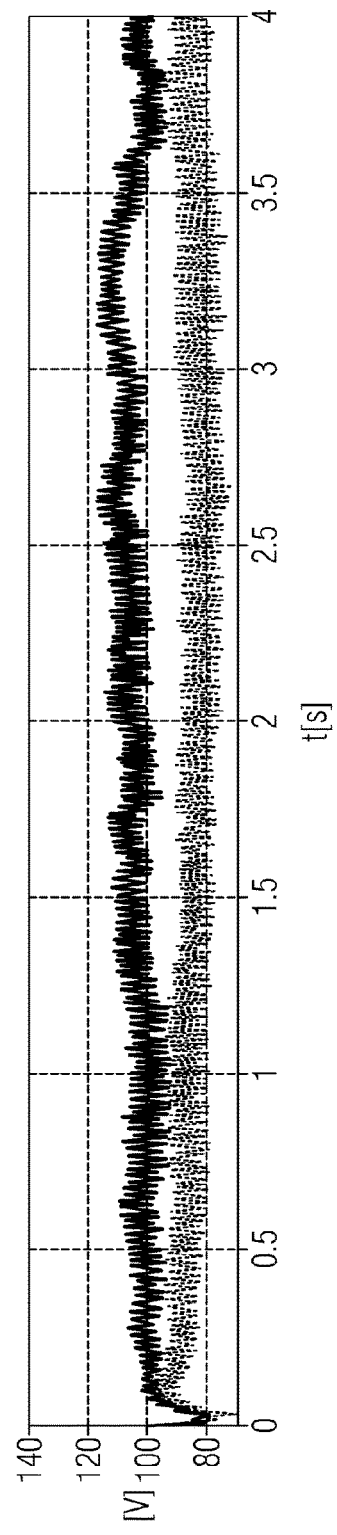

FIGS. 12 to 14 show schematic diagrams having the same time base plotted in seconds on the x-axis. The voltage in volts is plotted on the y-axis. The voltages represented in FIGS. 12 to 15 correspond to the respective converter module capacitor voltages, as they occur in the corresponding converter modules 1 represented in FIG. 7, and in the upper converter circuit 21 of the corresponding arm. FIGS. 16 to 19 represent the converter module capacitor voltages of the converter modules 1 in the lower converter circuit 21 according to FIG. 7. FIG. 20 shows a further superimposed representation of FIGS. 1, 7 and 9 to 19, in the interests of the further clarification of the subject matter.

The exemplary embodiments are intended solely for the purpose of the clarification of the teachings herein, and do not restrict the scope of the invention or the following claims. Naturally, functions, and specifically configurations with respect to the multi-level energy converter and the converter modules can be configured as required, without departing from the concept of the invention.

Finally, it should be noted that the advantages and characteristics and embodiments described with respect to the device according to the invention are equally applicable to a corresponding method. Accordingly, for characteristics of the device, corresponding characteristics of a method can be provided, and vice versa.

What is claimed is:

1. A multi-level energy converter for the conversion of electrical energy, the converter comprising:
    a first connection for the infeed of electrical energy to be converted;
    a second connection for the output of the converted electrical energy;
    a converter circuit connected to the first connection of the multi-level energy converter and comprising a plurality of series-connected converter modules;
    a center terminal coupled to the second connection;
    wherein the converter modules of the converter circuit for the execution of control are connected to a control unit which controls the converter modules to convert electrical energy;
    the converter modules comprising:
    the switching unit comprising four semiconductor switches connected in series to form two series circuits in parallel to one another and the two converter module connections;
    wherein a center terminal of each of the two series circuits comprises on of the two module connections;
    two series-connected converter module capacitors connected to the switching unit; and
    two additional semiconductor switches, each having a first terminal connected to a first of the two connection points of the two series circuits;
    wherein the series-connected converter module capacitors are connected to a second of the two connection points of the two series circuits;
    a second terminal of a first of the two additional semiconductor switches connected to a series circuit-free connection point of the two series-connected converter module capacitors;
    a second terminal of a second of the two additional semiconductor switches connected to a center terminal including the two series-connected converter module capacitors;
    each of the converter module capacitors respectively delivers a converter module capacitor voltage; and
    the switching unit switches the converter module capacitor voltage of one of the converter module capacitors or a summed voltage of the series-connected converter module capacitors to the converter module connections according to the respective switching state of the switching unit.

2. A method for operating a converter module of a multi-level energy converter by means of a control unit, the method comprising:
    controlling the switching states of one of two converter module connections of the converter module and a switching unit having four semiconductor switches connected in series to for two series circuits in parallel to one another, wherein a center terminal of each of the two series circuits comprises one of the two converter module connections;
    wherein two series-connected converter module capacitors connected to the switching unit, respectively deliver a converter module capacitor voltage;
    wherein two additional semiconductor switches each have a first terminal connected to a first of the two converter module connections and the series-connected converter module capacitors are connected to a second of the two converter module connections;
    wherein a second terminal of a first of the two additional semiconductor switches is connected to a series circuit-free connection point of the two series-connected converter module capacitors and a second terminal of a second of the two additional semiconductor switches is connected to a center terminal of the two series-connected converter module capacitors; and
    switching with the switching unit the converter module capacitor voltage of one of the converter module capacitors or a summed voltage of the series-connected converter module capacitors to the converter module connections, according to the respective switching state of the switching unit.

3. The method as claimed in claim 2, further comprising identifying, in a converter module circuit of the multi-level energy converter, the converter module in which the maximum or minimum voltage difference on the two series-connected converter module capacitors is present.

4. The method as claimed in claim 2, further comprising supplying at least one of the converter modules with an electric current flowing in the converter module, which is based upon a second-order harmonic of a converter module current.

5. The method as claimed in claim 3, wherein, for the delivery of an electrical voltage by the converter circuit which requires the activation of an uneven number of series-connected converter module capacitors of the converter modules on the converter module circuit, depending upon whether the charging or discharging of the series-connected converter module capacitors is in progress, the converter module with the maximum or minimum voltage difference is selected for the activation of one of its converter module capacitors.

6. The method as claimed in claim 3, further comprising identifying converter modules of the converter circuit in which the magnitude of the voltage difference exceeds a predetermined comparison value.

7. The method as claimed in claim 5, wherein, in the other converter modules of the converter circuit, either both of the two series-connected converter module capacitors are activated, or none of the two series-connected converter module capacitors is activated.

8. The method as claimed in claim 5, further comprising activating, in the selected converter modules, the respective converter module capacitor such that, in any subsequent regulation duty of the multi-level energy converter, the magnitude of the voltage difference is reduced.

9. The method as claimed in claim 6, wherein, depending upon the electrical voltage to be delivered by the converter circuit, a plurality of converter modules can be selected, in which only one of the two converter module capacitors is activated.

10. A converter module for a multi-level energy converter for the control of switching states of the switching unit, the converter module comprising:
- a switching unit including four semiconductor switches connected in series to form two series circuits and two converter module connections; and
- two series-connected converter module capacitors connected to the switching unit;
- wherein each of the two series-connected converter module capacitors respectively delivers a converter module capacitor voltage;
- the switching unit switches the converter module capacitor voltage of one of the two series-connected converter module capacitors or a summed voltage of the two series-connected converter module capacitors to the converter module connections according to the respective switching state of the switching unit;
- the two series circuits are connected in parallel to one another and, in each case, a center terminal of one of the series circuits constitutes one of the converter module connections respectively;
- the switching unit includes two further semiconductor switches, each of which is connected on one of its terminals to a first connection point of the two series circuits;
- a second connection point of the two series circuits is connected to the series-connected converter module capacitors;
- the other terminal of one of the two further semiconductor switches is connected to a series circuit-free connection point of the series-connected converter module capacitors; and
- the other terminal of the other of the two further semiconductor switches is connected to a center terminal constituted by the series-connected converter module capacitors.

11. The converter module as claimed in claim 10, wherein the switching unit, according to the respective switching state of the switching unit, alternates the polarity of the voltage switched to the converter module connections.

12. The converter module as claimed in claim 10, wherein the switching unit, according to the respective switching state of the switching unit, electrically short-circuits the converter module connections.

13. A converter module for a multi-level energy converter for the control of switching states of the switching unit, the converter module comprising:
- a switching unit including two semiconductor switches connected in series to form a series circuit and two converter module connections; and
- two series-connected converter module capacitors connected to the switching unit;
- wherein each of the two series-connected converter module capacitors respectively delivers a converter module capacitor voltage;
- the switching unit switches the converter module capacitor voltage of one of the two series-connected converter module capacitors or a summed voltage of the two series-connected converter module capacitors to the converter module connections according to the respective switching state of the switching unit;
- a center terminal of the series circuit constitutes one of the converter module connections;
- a connection point of the series circuit with the series-connected converter module capacitors constitutes the other of the converter module connections;
- the switching unit includes two further semiconductor switches which, on a first terminal respectively, are connected to a converter module connection-free connection point of the series circuit;
- a second terminal of a first of the two further semiconductor switches is connected to a converter module connection-free connection point of the series-connected converter module capacitors; and
- a second terminal of a second of the two further semiconductor switches is connected to a center terminal constituted by the series-connected converter module capacitors.

14. The converter module as claimed in claim 13, wherein the switching unit, according to the respective switching state of the switching unit, alternates the polarity of the voltage switched to the converter module connections.

15. The converter module as claimed in claim 13, wherein the switching unit, according to a respective switching state of the switching unit, electrically short-circuits the converter module connections.

\* \* \* \* \*